United States Patent [19]

Winzer et al.

[11] Patent Number: 4,498,731
[45] Date of Patent: Feb. 12, 1985

[54] OPTICAL WAVEGUIDE BRANCH COUPLER AND METHOD OF MANUFACTURING

[75] Inventors: Gerhard Winzer, Munich; Romuald V. Tomkewitsch, Ebenhausen, both of Fed. Rep. of Germany

[73] Assignee: Siemens Aktiengesellschaft, Berlin & Munich, Fed. Rep. of Germany

[21] Appl. No.: 480,318

[22] Filed: Mar. 30, 1983

[30] Foreign Application Priority Data

Apr. 5, 1982 [DE] Fed. Rep. of Germany ....... 3212619

[51] Int. Cl.³ ............................................ G02B 5/14
[52] U.S. Cl. ............................. 350/96.16; 350/96.15; 350/320
[58] Field of Search ............... 350/96.15, 96.16, 96.20, 350/316, 320

[56] References Cited

U.S. PATENT DOCUMENTS

| | | | |
|---|---|---|---|
| 3,870,398 | 3/1975 | Love | 350/96.16 |
| 3,874,779 | 4/1975 | Thiel | 350/96.16 |
| 4,234,969 | 11/1980 | Singh | 350/96.16 X |
| 4,253,727 | 3/1981 | Jeunhomme et al. | 350/96.15 |
| 4,285,571 | 8/1981 | Winzer | 350/96.16 X |
| 4,339,170 | 7/1982 | Winzer | 350/96.16 |
| 4,339,290 | 7/1982 | Winzer et al. | 156/159 |

FOREIGN PATENT DOCUMENTS

| | | |
|---|---|---|
| 2418994 | 10/1975 | Fed. Rep. of Germany ... 350/96.15 |
| 2920957 | 11/1980 | Fed. Rep. of Germany ...... 156/159 |
| 0045437 | 2/1982 | Fed. Rep. of Germany ... 350/96.15 |

OTHER PUBLICATIONS

"Coupler for Optical Data" IBM Technical Disclosure Bulletin, vol. 16, No. 5, Oct. 1973.

*Primary Examiner*—William L. Sikes
*Assistant Examiner*—Akm E. Ullah
*Attorney, Agent, or Firm*—Hill, Van Santen, Steadman & Simpson

[57] ABSTRACT

An optical device such as a branch element comprising a body having at least one port with each port being formed by an integral cylindrical guide plug extend from an outer surface of the body and coaxially receiving an optical waveguide such as a fiber with the end surface of the waveguide and the plug being coplanar. The optical device is made by assembling a plurality of parts having planar surfaces with the planar surfaces engaged with each other and with the parts having semi-cylindrical projections having a flat surface lying in the plane of the planar surfaces to aid in aligning the projections to form the guide plugs, the planar surfaces are provided with coacting adjustment portions comprising recesses receiving projections or posts.

26 Claims, 5 Drawing Figures

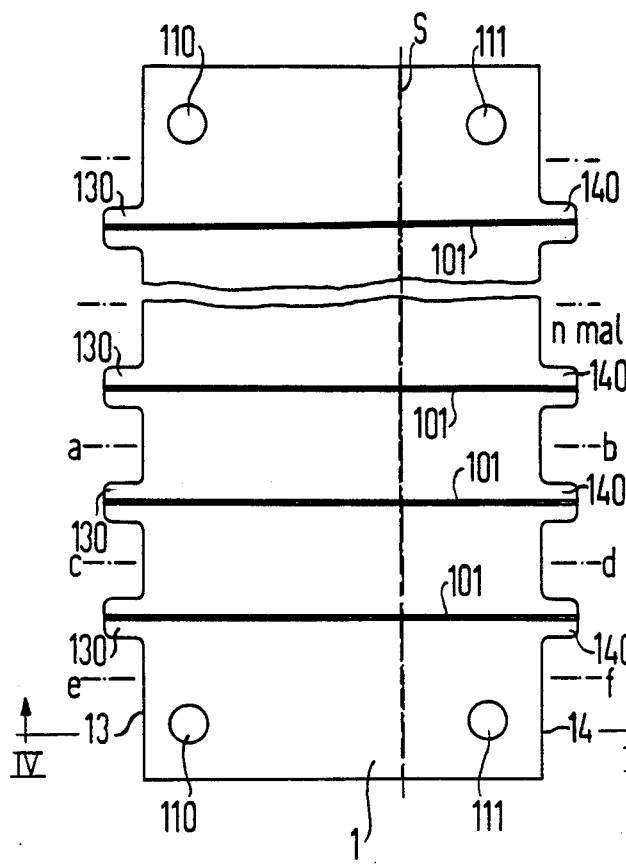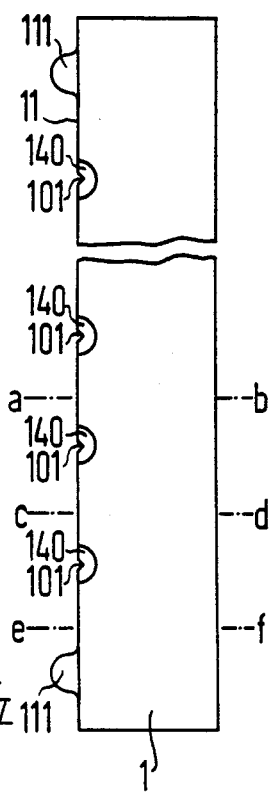

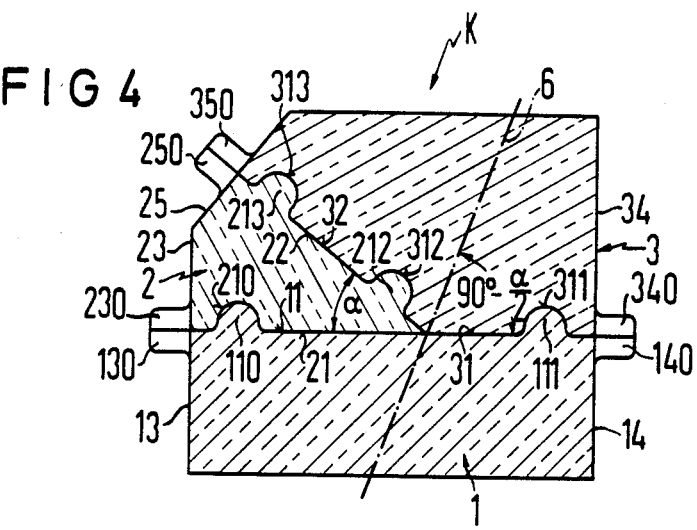
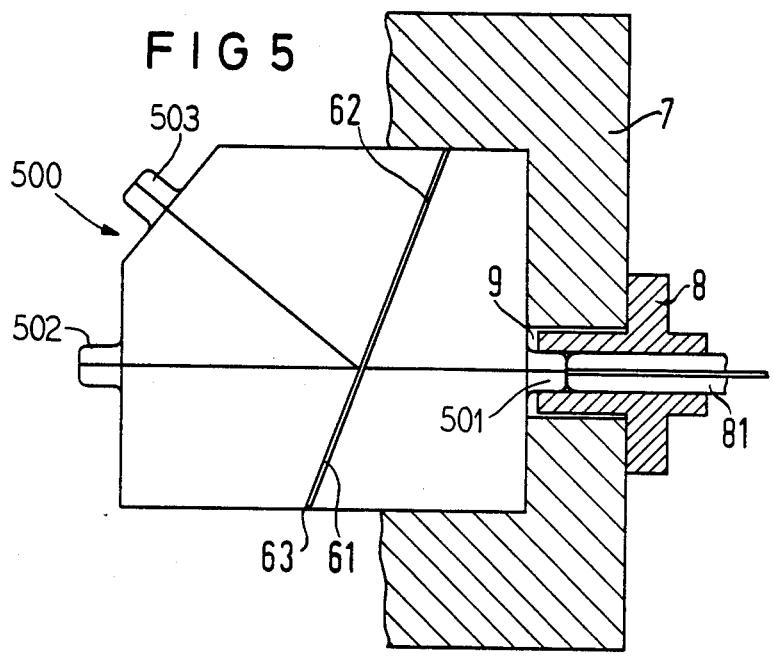

OPTICAL WAVEGUIDE BRANCH COUPLER AND METHOD OF MANUFACTURING

BACKGROUND OF THE INVENTION

The present invention is directed to an optical device, a method of manufacturing the optical device and an intermediate part which is utilized in the method of manufacturing the optical device. Briefly, the method is directed to assembling a plurality of two or more intermediate parts which have lateral planar surfaces with at least one of the planar surfaces having a guide groove which receives an optical waveguide such as an optical fiber. After asembling the parts with the fibers in the grooves, a body is produced which can be utilized in subsequent steps to form optical devices such as branching elements.

A method for forming a branching device by providing two parts, one of which has a guide groove for receiving an optical fiber, joining the two parts together to form an intermediate body, providing a third part having a groove for receiving a fiber and assembling the intermediate body on the third part is disclosed in U.S. Pat. No. 4,339,290 which claims priority from German patent application No. 29 20 957. As disclosed in this patent, the method forms a composite body which exhibits a plurality of parallel extending light waveguide branch elements and the individual light waveguide branch elements can be manufactured by cutting them from the composite body. A significant problem in the manufacture of such a composite body or of the finished branch elements is the amount of time which is required for adjusting the various parts that are assembled together to form the composite body. In addition, after the branch element has been formed, plugs must be assembled thereon and the assembly of the plugs relative to the individual light waveguides is a time-consuming operation.

SUMMARY OF THE INVENTION

The present invention is to provide an improved optical device, a method of manufacturing the optical device by manufacturing a composite body and improved parts utilized in forming the composite body. The method and the parts enable reducing a time loss due to the adjustment of the various parts as they are being assembled relative to one another while forming the composite body. The parts when assembled into the composite body provide integral guide plugs which thus overcome the problems of loss of time in assembling guide plugs onto the finished element.

To obtain these objects, the present invention is directed to an optical device such as a branch element which has a body having at least one port, each port being formed by an integral cylindrical guide plug extending from an outer surface of the body, said plug having an end surface or face lying in a plane perpendicular to the axis of the plug and an optical waveguide such as an optical fiber being coaxially disposed in said plug with an end face lying in the plane of the end surface of the plug to form the optical part.

To form such a device the method comprises the steps of providing a first part and a second part, said first and second parts each having a lateral planar surface extending at right angles to an outer surface of the part to an opposite edge, said outer surface of each part having at least one projection having a surface in the plane of the lateral surface and a shape of approximately one-half of the cylindrical guide plug, at least one of the first and second parts having a guide groove for each of the semi-cylindrical projections extending inward at right angles to the outer surface to the opposite edge of the lateral surface, said first and second parts having adjustment means comprising coacting recesses and projections or posts for guiding the first and second parts as they are assembled with their lateral surface engaging and with the projections being matched to form a cylindrical guide plug; providing an optical waveguide in each of the guide grooves of the one part; assembling the first and second parts together with the lateral surfaces engaging each other and the projections being received in the recesses to insure that the semi-cylindrical projections of the parts are matched to form the cylindrical guide plugs with the coaxially positioned waveguide; and securing the two parts together to form the body.

In detail, the specific features of the solution act to the effect that the employment of the precision-manufactured one-piece parts reduces the number of parts to be assembled and to be adjusted relative to one another. The adjustment means which comprise the recesses or depressions and the post or projections cause the step of adjusting the position of the two parts to be a self-adjustment. The projections on the parts which coact to form the cylindrical guide plug will be easily aligned with each other to form the cylindrical guide plug due to the presence of the adjustment means.

While guide grooves for the optical waveguide such as the optical fibers can be provided on both of the two mating planar lateral surfaces, it is desirable to only provide them on one of the two mating surfaces. By eliminating providing grooves on both of the two mating surfaces, some manufacturing costs are saved and also the problem of aligning the grooves to be congruent will not exist.

It is also expedient that only one of the two mating planar faces is provided with all of the recesses of the adjustment means and the other one is provided with the post or projections of the adjustment means. Thus, a potential polishing operation which will often be necessary is easily undertaken on the lateral face which only has the recesses. In addition, it is desirable that the recesses and the post have a circular cross-section and are preferably placed adjacent the corners of the parts so that they do not interfere with any necessary polishing of the planar surfaces.

It should be noted that since the outer surfaces adjacent the planar lateral surface extend at a right angle thereto and to the groove containing the optical waveguide, the projections which coact to form the cylindrical guide plug will extend perpendicular from this surface. As a result thereof, the outer surface of the composite body will be at a right angle to the cylindrical plug and the fiber contained therein.

It is also advantageous that each of the projections on the outer surface have a planar face lying in the plane of the lateral face of the part. Thus, the groove formed in one of the two matching lateral planar faces will extend into this surface and at the free end of the projection the light waveguide such as an optical fiber that is inserted in the guide groove will then automatically be coaxially adjusted relative to the guide plug formed by the two projections during the assembly operation. Preferably, each of these projections is a semi-cylindrical projection which has a semi-circular cross-section. As a result thereof, the plug formed by the joining of two projections together will be a cylindrical plug having a circular cross-section.

It is particularly desirable that the composite body is formed of a plurality of single piece parts. Each of these parts minus the guide grooves, the recesses and projections or posts for the adjustment means and the projections on the outer surface which are eventually formed into the guide plugs has basically a prismatic body shape. These single piece parts are particularly molded from glass by means of a precision hot-press method which will enable molding the parts with the desired projections, recesses and post for the adjustment means as well as the guide grooves.

It is desirable that more than two parts are joined together so that a branching waveguide operating on a beam splitter principle can be produced. Thus, after the method has two parts joined together to form the body, the body with a surface preferably also being a planar lateral surface is assembled with a planar lateral surface of the third part with one of the two surfaces having guide grooves which will be aligned with the waveguides of the body and the two lateral surfaces with coacting adjustment means. By assembling the third part to the body, a composite body is produced. If like in the above-mentioned U.S. patent, the body was manufactured with a multitude of individual light waveguides arranged in parallel planes, individual elements can then be obtained by means of severing along a plane between the planes of the waveguides and their plugs. It is expedient that when a branch element is being manufactured that the body formed by joining the two parts together has the planar surface again polished to have the individual waveguides end in that surface.

It should be expressly pointed out that the inventive method is in no way restricted to the manufacture of light waveguide branchers according to the beam-splitting principle but rather the bodies having the greatest variety of light waveguide arrangements can be manufactured. Thus, particularly branchers according to the principle of fiber axis offset, core notch branchers, star couplers and the like can be constructed in accordance with the present invention.

BRIEF DESCRIPTION OF THE DRAWINGS

FIG. 2 is a plan view of the lowermost part of FIG. 1;

FIG. 3 is an end view of the part of FIG. 2;

FIG. 4 is a cross-sectional view taken along the line approximately IV—IV of FIG. 2 of the assembled parts of FIG. 1 forming the composite block; and FIG. 5 is a side view of a finished light waveguide branch element formed in accordance with the principles of the present invention.

DESCRIPTION OF THE PREFERRED EMBODIMENTS

Figure 1:
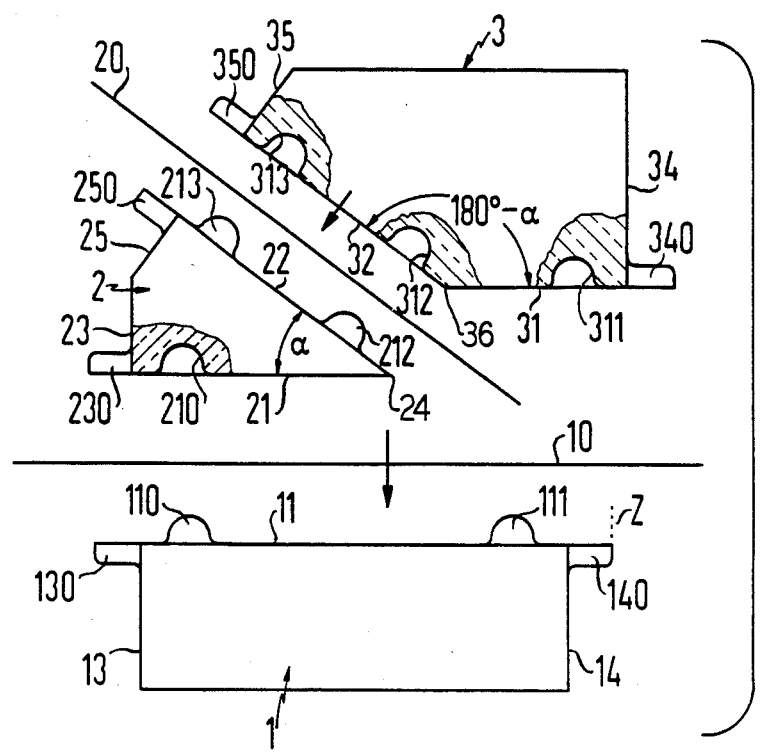
FIG. 1 is an exploded side view of three prismatic, precision manufactured single-piece parts in accordance with the present invention with portions broken away for purposes of illustration.

The principles of the present invention are particularly useful for forming an optical device generally indicated 500 in FIG. 5 which is illustrated as a branch element with a semi-reflecting mirror layer 63 interposed between cut and polished surfaces 61 and 62. The branch element is also provided with three guide plugs 501, 502 and 503 with the plugs 501 and 502 being on the same axis and terminating at adjacent ends of a waveguide of the device 500. The plug 503 is for the branch waveguide which merges with the other waveguide which is defined by the plugs 501 and 502 at the plane of the semi-reflecting layer 63. As illustrated in FIG. 5, the plug 501 enables forming a connection with an exterior optical waveguide in a plug 81. This is accomplished by the plug 501 being received in a tubular element 8 which has a flange and is provided in a bore 9 of a housing or frame member 7. The plug 501 is received in the member 8 as well as the exterior plug 81 to form the plug connection with the two waveguides in abutting relationship.

To form the device 500, the method starts with three prismatic parts which are illustrated in FIG. 1. As illustrated, a first prismatic part 2 has a wedge shape, a second prismatic part 3 complements the wedge shape of the first part 2 and the third prismatic part 1 has a substantially cuboid-like base. The first part 2 has a first planar lateral face or surface 22 and a second planar lateral face or surface 21 which merge along a line 24 at an angle $\alpha$. The second part 3 has a third planar lateral face or surface 32, and a fourth planar lateral face 34 which also merge along a line 36 and form an angle $180° - \alpha$. The third part 1, which is a base part, has the fifth lateral planar face 11 which has as a plurality of upstanding projections, elevations or post 110 and 111 which are part of an adjustment means. As best illustrated in FIG. 2, the projections or post 110 and 111 are formed adjacent each of the corners of the part 1. In addition, the surface 11 is provided with a plurality of parallel extending guide grooves 101 which will receive an optical waveguide such as a fiber 10. For each groove 101, the base 1 also has an outwardly extending projection 130 and 140 with the projection 130 extending from an outer surface 13 that is perpendicular to the fifth planar lateral surface 11 and the projection 140 extending from the outer surface 14 which is perpendicular to the surface 11. Each of the projections 130 and 140 preferably have a semi-cylindrical shape with the surface lying in the plane of the surface 11 and the groove 101 lies on the axis of each semi-cylindrical projection.

For each of the projections 110 of the part 1, the part 2 on the second planar surface 21 has a recess 210. In addition, for each of the projections 130 extending from a surface 13, the part 2 has a projection 230 which extends from an outer surface 23. Thus, the surface 21 is similar to the left half of part 1 in FIG. 2 up to line 5 except it does not have grooves 101. In addition, the part 2 on the first planar surface 22 has projections 212 and 213 which are also aligned in the corners of that surface. The surface 22 at the same spacing interval as the interval between the grooves 101 are provided with grooves not illustrated which receive optical fibers 20 forming optical waveguides. Each of these grooves is provided with a projection 250 which is substantially the same structure as the projections 130 discussed hereinabove. The projections 250, which are semi-circular extend from an outer surface 25.

The second part 3 on its planar surface 32 has recesses 313 and 312 which are aligned to coact with the projections 213 and 212 of the first part 2. In addition, the second part 3 on an outer surface 35 which extends perpendicular to the surface 32 has semi-cylindrical projections 350 which when the two surfaces 22 and 32 are placed together will be aligned with the projections 250 to form the cylindrical guide plugs such as 503

(FIG. 5). Surface 31, which is the fourth planar surface, has recesses 311 which are positioned to receive the projections or post 111 of the third part 1. Also, on an outer surface 34 that extends perpendicular to the surface 31, part 3 has a plurality of projections 340 which have a semi-cylindrical shape and coact with the projections 140 of the third part 1 form the plugs 501 of FIG. 5. Thus, surface 31 will appear similar to the upper surface of part 1 without grooves 101 to the right of line 5 in FIG. 2.

As illustrated in FIG. 1, the projections 212 and 213 as well as the coacting recesses 312 and 313 act as adjustment means for positioning the first part 2 and the second part 3 with the projections 250 aligned with the projections 350 to form the branch guide plugs 503. In a similar manner, when the body formed of the parts 2 and 3 is assembled with the third part 1, the projections 110 and 111 coact with the recesses 210 and 311 to form adjustment means to align the semi-cylindrical projections 130 and 230 to form the guide plug 502 and the projections 140 and 340 to form the guide plug 501.

In the embodiment illustrated, the surfaces 21 and 22 which meet at a line 24 and form an angle $\alpha$, which is less than 90°. However, $\alpha$ can be $\leqq 90°$ depending on the desired branch structure. The only requirement is that the surfaces 31 and 32 form an angle $180° - \alpha$.

As mentioned hereinabove, each of the projections such as 130, 140 of the part 1 or 230, 250 of the part 2 or 340, 350 of the part 3 have substantially the same configuration and are a semi-cylindrical projection which has a semi-circular cross-section. Each of the projections 110, 111 as well as 213, 212 have a circular cross-section which is best illustrated by the projections 110 and 111 in FIG. 2. The recesses 210, 311, 312 and 313 all have a matching circular cross-section which will receive their respective projections.

Each of the three parts 1, 2 and 3 is a one-piece glass part which is preferably manufactured by means of a precision hot pressing process or method. These parts together with their guide grooves, the molded projections and adjustment means can be manufactured in one piece and with the required high precision with this method.

To form the branching elements such as the optical device 500 of FIG. 5, the process comprises the following steps: providing the first part 2 and the second part 3 having the desired projections, guide grooves and adjustment means; positioning a light waveguide 20 which is preferably a glass fiber in each of the guide grooves on the first planar face 22; and assembling the second part 3 on the part 2 utilizing the adjustment means comprising the coacting projections and recesses 212, 312, and 213 and 313. The adjustment means will align each of the projections 350 with their corresponding projections 250 to form the cylindrical guide plugs. After the alignment, it is also noted that the other planar surfaces such as 21 and 31 will lie in a single plane.

After positioning, the parts 2 and 3, they are joined together such as with an adhesive or by utilizing a glass solder. Subsequent to securing the two parts together, the ends of the waveguides 20 extending past the common planar surface formed by the surfaces 21 and 31 are polished to lie in the new planar surface.

The next step after providing the base or third part 1 having the desired configuration, comprises placing optical fibers 10 in each of the grooves 101. Then the body which is formed by the parts 2 and 3 which were secured together is aligned and assembled on the planar surface 11 of the part 1. Thus, the projections 110 will be received in the recesses 210 and the projections 111 received in recesses 311 to insure the desired alignment between the semi-cylindrical projections 130 and 230 as well as the projections 140 and 340. The body composed of the secured-together parts 2 and 3 is then secured such as by bonding on the part 1 to form the enlarged body or composite body K of FIG. 4. After the composite body is formed, the exposed ends of the waveguides 10 as well as the exposed ends of the waveguide 20 are cut and polished to lie in the plane Z (FIG. 1) which is perpendicular to the axis of the waveguides. Thus, both the end face of the plug such as 501 and the end face of the coaxially disposed waveguide lie in the same plane. The next step depends on what type of device is being formed.

In order to form a light waveguide branch element utilizing the beam-splitter principle, the body K (FIG. 4) is cut along a plane 6 which plane intersects the tip formed by the line 24 of the wedge-shaped part 2. The plane 6 is also inclined to the lateral plane face 11 of the base part 1 by an angle $90° - \frac{1}{2}\alpha$. It should be noted that the step of cutting should be carried out so that the end faces of the fibers 20 which are lying between the surfaces 22 and 23 adjacent the planar surfaces 21 and 31 are not damaged. After cutting along the plane 6, a pair of parting planes or surfaces 61 and 62 are formed. These parting surfaces are then polished and a semi-reflecting mirror layer 63 is applied to at least one of the two surfaces 61 and 62. The two parts are then reassembled and secured together such as by glue so that the parting planes 61 and 62 lie opposite one another and each light waveguide 10 of each part is aligned.

If each of the parts had a plurality of guide grooves such as 101 of FIG. 2, then the individual branch elements are manufactured by cutting the reassembled body K along planes indicated by the lines a-b, c-d, e-f, etc. in FIGS. 2 and 3. While it is possible to polish each of the end faces of the guide plugs after the separate elements have been severed from the composite, it is desirable to do this polishing prior to the cutting of the individual elements along the plane such as a-b. It is also noted that the polishing of the end faces of each of the plugs can be done after the severing along the line 6, the applying of the reflective layer 63 and the reassembly of the two parts. It should be noted that it may be desirable to polish the surfaces formed while cutting on the plane such as a-b, c-d and e-f, etc.

The method described hereinabove has two significant advantages over the methods previously utilized. First, the number of gluing surfaces required for constructing the element is reduced from the previous five surfaces to three. This method not only simplifies the manufacturing of the branching elements but also improves the mechanical properties and the temperature behavior of the elements. In addition, the subsequent adjustment of the light waveguide flanges or plugs for a branching element is eliminated because these plugs are integral with the body formed by securing the parts together. This advantage is achieved due to the provision of the semi-circular projections. The adjustment means utilizing projections and recesses in addition to enabling alignment of the projections forming the solder can also be advantageously utilized for connecting the parts instead of the optical adhesive or glue.

While the method has been discussed and describe for forming a branch element utilizing a beam divider principle, the method can be utilized for other types of optical couplers which do not require the step of severing the composite body and applying a reflecting layer.

Although various minor modifications may be suggested by those versed in the art, it should be understood that we wish to embody within the scope of the patent granted hereon, all such modifications as reasonably and properly come within the scope of our contribution to the art.

We claim:

1. A method of forming a body having at least one cylindrical guide plug projecting from an outer surface concentrically receiving an optical waveguide extending into said body, said method comprising the steps of providing a first part and a second part, said first and second parts each having a lateral planar surface extending at right angles to an outer surface of the part to an opposite edge, said outer surface of each part having at least one projection having a surface in the plane of the lateral surface and a shape of approximately one-half of the cylindrical guide plug, at least one of the first and second parts having a guide groove for each of the semi-cylindrical projections extending inward at right angles to the outer surface to the opposite edge of the lateral surface, said first and second parts having adjustment means comprising coacting recesses and projections for guiding the first and second parts as they are assembled with their lateral surface engaging and with the projections being matched to form a cylindrical guide plug; providing an optical waveguide in each of the guide grooves of the one part, assembling the first and second parts together with the lateral surfaces engaging each other and the projections being received in the recesses to insure that the semi-cylindrical projections of the parts are matched to form the cylindrical guide plugs with the coaxially positioned waveguide, and securing the two parts together to form the body.

2. A method according to claim 1, where only the lateral surface of one of the first and second parts has the guide grooves.

3. A method according to claim 1, wherein the step of providing the adjustment means provides all of the recesses on one surface and all of the coacting projections on the other surface of the two parts.

4. A method according to claim 3, wherein the step of providing the guide grooves and providing adjustment means includes providing the guide grooves on the surface having the projections of the adjustment means.

5. A method according to claim 1, wherein each of the projections and recesses of the adjustment means have a circular cross-section.

6. A method according to claim 1, wherein the coacting projections and recesses of the adjustment means are provided adjacent the corners of the lateral planar surfaces of each part.

7. A method according to claim 1, wherein the body formed by joining the first and second parts has at least one additional lateral surface and an outer surface extending at right angles thereto, said outer surface having a projection having a surface lying in the plane of the additional lateral surface, the method further including providing a third part having a lateral surface extending at right angles to an outer surface, said outer surface having a projection coacting with the projection of the additional lateral surface of the body to form a cylindrical guide plug when the third part is assembled on said body, one of the lateral surfaces for each projection having a guide groove for receiving an optical waveguide, said surfaces on the body and the third part having adjustment means comprising coacting recesses and projections for positioning the body and part with the projections aligned to form the cylindrical guide plug, assembling waveguides in the grooves in the lateral surface, subsequently assembling the third part on the body utilizing the adjustment means to insure the desired position and securing the third part and body together to form an additional larger body.

8. A method according to claim 1, wherein each of the projections on the outer surface are approximately one-half of the semi-circular cross-section of the cylindrical plug.

9. A method according to claim 1, wherein the step of providing each of the parts comprises providing a prismatic body.

10. A method according to claim 1, wherein the step of providing each of the bodies comprises providing a precision hot-pressed glass body.

11. A method according to claim 1, which further includes after forming said body, polishing the end of the waveguide and the end surface of the cylindrical guide plug to be flat and perpendicular to the axis of the waveguide.

12. A method according to claim 1, wherein the step of providing the first and second bodies provides more than one projection from the outer surface of the first and second bodies and provides parallel extending guide grooves, said method further including after joining the first and second parts together to form a body, providing an additional part having a lateral surface extending at right angles to an outer surface, said outer surface having spaced projections with a number of projections equal to the number of grooves provided in the first and second parts, the body formed from the first and second parts having a lateral surface extending at a right angle to an outer surface, said lateral surface of the body and the third part having adjustment means comprising coacting projections and recesses for adjusting the position of the body and third part so that the projections thereon are aligned to form cylindrical guide plugs, assembling waveguides in the grooves in the lateral surface between the third body part and the body, assembling the third part on the body utilizing the adjustment means and securing the body to form a larger body, subsequently after securing the third part on the body, severing the larger body between the optical fiber arrangements to form individual bodies containing optical waveguide arrangements.

13. A method according to claim 1, wherein the step of providing first and second bodies provides the first body as a wedge-shaped member having a second lateral face extending at an angle $\alpha$ to the first-mentioned lateral face, said angle $\alpha \leq 90°$, the second part having a second lateral face extending at an angle $180° - \alpha$ from its first lateral face, each of said additional lateral faces extending to an additional outer surface which extends at right angles thereto, said additional outer surfaces having projections coacting with similar projections to form cylindrical guide plugs, said additional faces of the first and second bodies being provided with additional adjustment means coacting with parts of adjustment means on a third part to position the third part therewith, said method including the steps of subsequent to assembling the first and second parts together to form the body, providing a third part having adjustment face provided with adjustment means including part of the coacting recesses and projections for coacting with the adjustment means on the additional adjustment faces of the body, said third part having projections from an outer surface coacting with the projections of the body to form cylindrical guide plugs, the lateral surface of the body and the third part having a guide groove extending between opposite projections, assembling optical waveguides in each of the guide grooves and, assembling the third part and the body together utilizing the adjustment means, and curing said part and body together to form an enlarged body.

14. A method according to claim 13, wherein the step of providing the first, second and third parts with projections for forming guide plugs provides a plurality of projections so that there are a plurality of parallel extending guide grooves, said method further including subsequent to joining the third part to the body to form a large body, severing the large body along parallel planes to form individual branch connections.

15. A method according to claim 13, which further includes subsequent to joining the third part on the body to form the enlarged body, polishing the ends of each of the fibers and the end of each of the cylindrical plugs to lie in a plane extending perpendicular to the axis of the waveguide.

16. A method of forming a branch connection comprising the steps of providing a first part having a wedge shape with a first and second lateral planar surfaces forming an angle with $\alpha$ being $\leq 90°$, providing a second part having a third and fourth planar surface, said third and fourth planar surfaces forming an angle $180° - \alpha$; providing a third part having a fifth planar surface, said step of providing the first part providing the first part with semi-cylindrical projections having a flat surface extending from outer surfaces adjacent the first and second planar surfaces with the flat surface lying therein and providing a guide groove for each of the semi-circular projections in the first planar surface, the step of providing said second part providing semi-circular projections on outer surfaces adjacent the third and fourth planar surfaces, said semi-circular projections having a surface lying in the respective planar surface, said step of providing the third part providing semi-cylindrical projections of opposite ends of the part, said semi-cylindrical projections having surfaces lying in the plane of the fifth lateral surface and having a guide groove extending therebetween, said step of providing the first, second and third parts providing the first and third parts with adjustment means for positioning the first surface and the third surface with their respective semi-cylindrical projections aligned to form a cylindrical guide plug, providing the second and fourth surfaces as well as the fifth surface of the third part with coacting adjustment means to enable aligning the semi-cylindrical projections to form cylindrical guide plugs, said adjustment means comprising coacting recesses and projections; providing an optical waveguide in each of the grooves on the first planar surface, assembling the first and second parts together with the adjustment means positioning the first and third planar surfaces with the respective semi-cylindrical projections forming guide plugs, securing the assembled first and second parts to form a sub-body; polishing the end faces of the waveguides to lie in the plane of the second planar surface; providing optical waveguides in the grooves of the third part, assembling the third part with the sub-body utilizing the adjustment means between the fifth, second and fourth surfaces to align the semi-circular projections to form a cylindrical guide plug; securing the third part and the sub-body together to form the enlarged body.

17. A method according to claim 16, which includes cutting the enlarged body along a plane at an angle of $90° - \alpha/2$ to the first surface and intersecting the point of intersection of the first and second planar surface to form two members, polishing the cut surfaces, applying a semi-reflecting mirror on one of the polished cut surfaces, reassembling and securing the two members together with the waveguide aligned to form the complete unit.

18. A method according to claim 17, wherein the step of providing the semi-circular projections on each of the first, second and third parts provides a plurality of projections for each of the first, second, third, fourth and fifth surfaces having parallel extending axes and wherein subsequent to forming the completed unit severing the completed unit along parallel planes extending between the axes of the cylindrical guide plugs to form a plurality of individual branch elements.

19. A method according to claim 18, wherein prior to severing along the planes, polishing the waveguides and the end surfaces of each of the guide plugs so that the end surfaces lie in a plane perpendicular to the axis of the respective waveguide.

20. An optical device comprising a body having at least one port, each port being formed by one integral cylindrical guide plug extending from an outer surface of the body, said plug having an end surface lying in a plane perpendicular to the axis of the plug, and an optical waveguide coaxially disposed in said plug with an end surface lying in the plane of the end surface of the plug to form the optical port.

21. An optical device according to claim 20, wherein the device is a branch device having three ports, each of said ports comprising a cylindrical guide plug having an end surface extending perpendicular to the axis of the plug and coaxially containing an optical waveguide, two of said ports being coaxially aligned while the third port and its waveguide form an angle $\alpha$ with the first two ports, said angle $\alpha$ being $\leq 90°$.

22. An optical device according to claim 21, which includes a semi-reflecting layer lying at the intersection of the waveguide of the third port and the waveguide of the first and second ports.

23. A part having at least one planar surface extending from an outer surface to an opposite edge, said outer surface having a substantially semi-cylindrical projection with a flat surface lying in the plane of the planar surface, said planar surface having portions of an adjustment means comprising coacting recesses and projections so that the part can be assembled with a similar part with the semi-circular projections being aligned to form a cylindrical guide plug.

24. A part according to claim 23, which includes an additional planar surface merging with the first planar surface and forming an angle therebetween, said additional planar surface extending to an outer surface having a semi-cylindrical projection, said additional planar surface having portions of coacting recesses and projections of an adjustment means so that the part can be assembled with a similar part so that the projection of the additional planar surface coacts with another projection of the other part to form a cylindrical guide plug.

25. A part according to claim 24, wherein said angle is angle $\alpha$ with $\alpha$ being equal to or less than $90°$.

26. A part according to claim 24, wherein said angle is $180° - \alpha$, wherein $\alpha$ is equal to or less than $90°$.

* * * * *